(12) United States Patent
Jizodo et al.

(10) Patent No.: US 11,982,839 B2
(45) Date of Patent: May 14, 2024

(54) OPTICAL 90 DEGREE HYBRID CIRCUIT

(71) Applicant: Nippon Telegraph and Telephone Corporation, Tokyo (JP)

(72) Inventors: Makoto Jizodo, Musashino (JP); Manabu Oguma, Musashino (JP); Yusuke Nasu, Musashino (JP); Yuichiro Ikuma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 315 days.

(21) Appl. No.: 17/442,026

(22) PCT Filed: Apr. 16, 2020

(86) PCT No.: PCT/JP2020/016783
§ 371 (c)(1),
(2) Date: Sep. 22, 2021

(87) PCT Pub. No.: WO2020/213696
PCT Pub. Date: Oct. 22, 2020

(65) Prior Publication Data
US 2022/0171127 A1    Jun. 2, 2022

(30) Foreign Application Priority Data

Apr. 17, 2019 (JP) .................. 2019-078781

(51) Int. Cl.
*G02B 6/125* (2006.01)
*H01P 5/22* (2006.01)
*H04B 10/61* (2013.01)

(52) U.S. Cl.
CPC .............. *G02B 6/125* (2013.01); *H01P 5/227* (2013.01); *H04B 10/61* (2013.01)

(58) Field of Classification Search
CPC .......... H04B 10/61; H01P 5/227; G02B 6/125
See application file for complete search history.

(56) References Cited

U.S. PATENT DOCUMENTS 10,126,498 B1 * 11/2018 Ma .......................... G02F 1/011
11,223,425 B2 * 1/2022 Oka ....................... H04B 10/60
(Continued)

FOREIGN PATENT DOCUMENTS

JP    2017-116862 A    6/2017
WO   2011/001679 A1    1/2011
(Continued)

OTHER PUBLICATIONS

Hang Guan et al., *Compact and Low Loss 90° Optical Hybrid on a Silicon-On-Insulator Platform*, Optics Express, vol. 25, No. 23, 2017, pp. 28957-28968.

(Continued)

*Primary Examiner* — Sung H Pak
(74) *Attorney, Agent, or Firm* — Workman Nydegger

(57) ABSTRACT

To provide an optical 90-degree hybrid formed of a silicon waveguide capable of suppressing an optical loss and a phase error, and facilitating electronic packaging and optical packaging. In the optical 90-degree hybrid circuit including two optical branching units facing each other and two optical coupling units facing away from each other, four arm waveguides are arranged including bent waveguides each of which guides an output light of the optical branching unit to the optical coupling unit, and is formed in a curved shape.

9 Claims, 11 Drawing Sheets

(56) References Cited

U.S. PATENT DOCUMENTS

| | | |
|---|---|---|
| 2012/0082414 A1 | 4/2012 | Sakamaki et al. |
| 2013/0004123 A1 | 1/2013 | Watanabe |
| 2013/0279847 A1 | 10/2013 | Watanabe |
| 2019/0049665 A1 | 2/2019 | Ma et al. |

FOREIGN PATENT DOCUMENTS

| | | |
|---|---|---|
| WO | 2011/115285 A1 | 9/2011 |
| WO | 2012/086846 A1 | 6/2012 |

OTHER PUBLICATIONS

Takeshi Fujisawa et al., *Low-loss, Compact, and Fabrication-Tolerant Si-Wire 90° Waveguide Bend Using Clothoid and Normal Curves for Large Scale Photonic Integrated Circuits*, Optics Express, vol. 25, No. 8, 2017, pp. 9150-9159.

\* cited by examiner

OPTICAL 90 DEGREE HYBRID CIRCUIT

TECHNICAL FIELD

The present invention relates to an optical 90-degree hybrid circuit included in an optical receiver used in a coherent reception scheme in an optical transmission system. Specifically, the present invention relates to a planar optical 90-degree hybrid circuit formed of a silicon waveguide.

BACKGROUND ART

Optical circuits formed of silicon waveguides have an advantage that a circuit size can be dramatically reduced compared to an optical circuit made of conventional materials such as quartz, and have been actively researched and developed. Focusing on the realization of over 100 Gbit/s next generation ultra-high speed optical transmission systems, an optical multi-level modulation scheme, particularly, a coherent reception scheme such as Dual Polarization Quadrature Phase-Shift Keying (DP-QPSK) have attracted attention.

As for the optical 90 hybrid circuit among the optical receiver components used in the coherent reception schemes, products composed of planar lightwave circuits that are (PLC) made of materials such as quartz and formed on planar substrates have already been developed and manufactured. For the optical 90-degree hybrid circuit also, the optical circuit formed of the silicon waveguide has the advantage that a circuit size can be dramatically reduced compared to an optical circuit made of conventional materials such as quartz.

Manufacturing components other than the optical 90-degree hybrid circuit in the coherent optical receiver simultaneously in the optical circuit formed of the silicon waveguide enables provision of a more compact and highly integrated coherent optical receiver. From such backgrounds, practical use of the optical 90-degree hybrid circuit formed of the silicon waveguide is expected.

FIG. 1 is a configuration diagram illustrating a first conventional example of an optical 90-degree hybrid formed of an optical waveguide (see PTL 1). An optical delay interference circuit used to demodulate Differential Quadrature Phase-Shift Keying (DQPSK) signals is not a component included in the optical receiver used for the coherent reception schemes, but includes, in part of circuits, a function as an optical 90-degree hybrid circuit that multiplexes two lightwaves and separates into an In-phase component and a Quadrature component. Hereinafter, an In-phase component is referred to as an "I component" and a Quadrature component is referred to as a "Q component". FIG. 1 illustrates a configuration of only a circuit portion necessary to achieve an optical 90-degree hybrid function, extracted from the optical circuit described in PTL 1.

Here, a propagation process of a light input to the conventional optical 90-degree hybrid circuit in FIG. 1 is described. A signal light input from the outside passes through a signal light input waveguide 101 and is branched into two by an optical splitter 103 which is a first optical branching unit. A local oscillation light input from the outside passes through a local oscillation light input waveguide 102 and is branched into two by an optical splitter 104 which is a second optical branching unit.

Two beams of light branched by the optical splitter 103 pass through arm waveguides 105 and 108 and are input into two optical couplers 109 and 110 which are first and second optical coupling unit. Two beams of light branched by the optical splitter 104 pass through arm waveguides 106 and 107 and are input into two optical couplers 109 and 110 which are the first and second optical coupling unit.

The signal light and the local oscillation light input to the optical coupler 109 and the optical coupler 110 are multiplexed and interfered with each other, branched into two such that a phase difference between the interference beams of light is 180 degrees, and output.

The interference light between the signal light and the local oscillation light output from the optical coupler 109 is output via interference light output waveguides 111 and 112 to a differential receiving unit 115 that is formed as an external circuit and functions as a photoelectric conversion unit. The interference light between the signal light and the local oscillation light output from the optical coupler 110 is output via interference light output waveguides 113 and 114 to a differential receiving unit 116 that is formed as an external circuit and functions as a photoelectric conversion unit.

The optical splitter 104 into which the local oscillation light is input has a two-input two-output structure. Here, the optical splitter 104 uses a two-input two-output directional coupler or a Multimode Interferometer (MMI). At this time, two output beams of light from the optical splitter 104 including the directional coupler or the MMI are out of phase with each other by 90 degrees. This allows the differential receiving units 115 and 116 to detect, by differential phase detection, the interference beams of light output from the respective optical couplers 109 and 110 via the output waveguides 111, 112, 113, and 114, and thus, the I and Q components of the input modulated signal can be separated.

Here, in order to simultaneously detect the I component and the Q component of the modulated signal, waveguide lengths of two arm waveguides 105 and 108 transmitting the signal beams of light branched by at the optical splitter 103 are required to be equal to waveguide lengths of two arm waveguides 106 and 107 transmitting the local oscillation beams of light branched by the optical splitter 104, respectively. Furthermore, by equalizing the waveguide lengths of all four arm waveguides 105 to 108, it is possible to use as an optical 90-degree hybrid circuit included in an optical delay interference circuit for receiving differential phase modulation signals such as DQPSK.

CITATION LIST

Patent Literature

PTL 1: WO 2011/001679

Non Patent Literature

NPL 1: Hang Guan et al, "Compact and Low loss 90° optical hybrid on a silicon-on-insulator platform," OPTICS EXPRESS, Vol. 25, No. 23, pp. 28957-28968, (2017)

NPL 2: Takeshi Fujisawa et al, "Low-loss, compact, and fabrication-tolerant Si-wire 90° waveguide bend using clothoid and normal curves for large scale photonic integrated circuits," OPTICS EXPRESS, Vol. 25, No. 8, pp. 9150-9159, (2017)

SUMMARY OF THE INVENTION

Technical Problem

An optical circuit formed of a silicon waveguide, which generally use materials such as a silicon oxide film or a silicon nitride film for a clad, is high in a refractive index of a core and large in a refractive index contrast between the core and the clad, compared to a waveguide made of materials such as quartz. For this reason, as compared to a waveguide made of materials such as quartz, the optical circuit formed of the silicon waveguide is large in variations of a performance refractive index and propagation constant of a propagating light with respect to variations of a waveguide width or waveguide thickness of the core.

Therefore, in an optical 90-degree light hybrid having a structure as illustrated in FIG. 1 in which two arm waveguides cross and the arms need to be equal in length, that is, optical path lengths of beams of light propagating through the arms need to be equal, a phase error is likely to occur due to a processing error of the core waveguide in a case of use of a silicon waveguide more than in a case of use of a low refractive index material such as quartz.

In the structure of the optical 90-degree hybrid illustrated in FIG. 1, the longer the arm waveguides 105 to 108 connecting the optical splitters, the greater the effect of the processing error of the waveguides, and the greater the optical loss and the phase error.

The present invention has been made in view of such problems and has an object to provide an optical 90-degree hybrid formed of a silicon waveguide capable of suppressing an optical loss and a phase error, and facilitating electronic packaging and optical packaging.

Means for Solving the Problem

An aspect of the present invention includes the following configurations in order to achieve the object as described above.

Configuration 1

An optical 90-degree hybrid circuit including:
a first optical branching unit configured to branch a first input light into a first output light and a second output light, the first output light and the second output light having an identical phase;
a second optical branching unit configured to branch a second input light into a third output light and a fourth output light, a phase difference between the third output light and the fourth output light being 90 degrees;
a first optical coupling unit configured to multiplex the first output light and the third output light to generate first and second interference beams of light;
a second optical coupling unit configured to multiplex the second output light and the fourth output light to generate third and fourth interference beams of light;
a first arm waveguide configured to guide the first output light;
a second arm waveguide configured to guide the second output light;
a third arm waveguide configured to guide the third output light; and
a fourth arm waveguide configured to guide the fourth output light,
wherein an optical path length of the first arm waveguide is equal to an optical path length of the second arm waveguide, and
an optical path length of the third arm waveguide is equal to an optical path length of the fourth arm waveguide.

Configuration 2

The optical 90-degree hybrid circuit according to configuration 1,
wherein a central axis of the first optical branching unit in a light propagation direction does not overlap with a central axis of the second optical branching unit in a light propagation direction, and
a central axis of the first optical coupling unit in a light propagation direction does not overlap with a central axis of the second optical coupling unit in a light propagation direction.

Configuration 3

The optical 90-degree hybrid circuit according to configuration 2,
wherein the first to fourth arm waveguides include bent waveguides each formed in a curved shape.

Configuration 4

The optical 90-degree hybrid circuit according to configuration 3,
wherein the curved shape is an arc shape, and
each of the bent waveguides is provided with an offset between the bent waveguide and front and rear waveguide parts of the arc shape.

Configuration 5

The optical 90-degree hybrid circuit according to configuration 3,
wherein the curved shape is a clothoid curve shape.

Configuration 6

The optical 90-degree hybrid circuit according to any one of configurations 1 to 5,
wherein the optical 90-degree hybrid circuit is formed in a silicon optical waveguide chip,
the optical 90-degree hybrid circuit includes:
a first photoelectric conversion unit configured to differentially receive the first and second interference beams of light; and
a second photoelectric conversion unit configured to differentially receive the third and fourth interference beams of light,
a waveguide through which the first or second input light propagates passes between the first or second photoelectric conversion unit and an end portion of the silicon optical waveguide chip, and
orientations of inputs of the first and second input beams of light coincide with each other.

Effects of the Invention

As described above, according to the present invention, it is possible to provide an optical 90-degree hybrid formed of a silicon waveguide capable of suppressing an optical loss and a phase error, and facilitating electronic packaging and optical packaging.

DESCRIPTION OF EMBODIMENTS

First Embodiment

Figure 2:
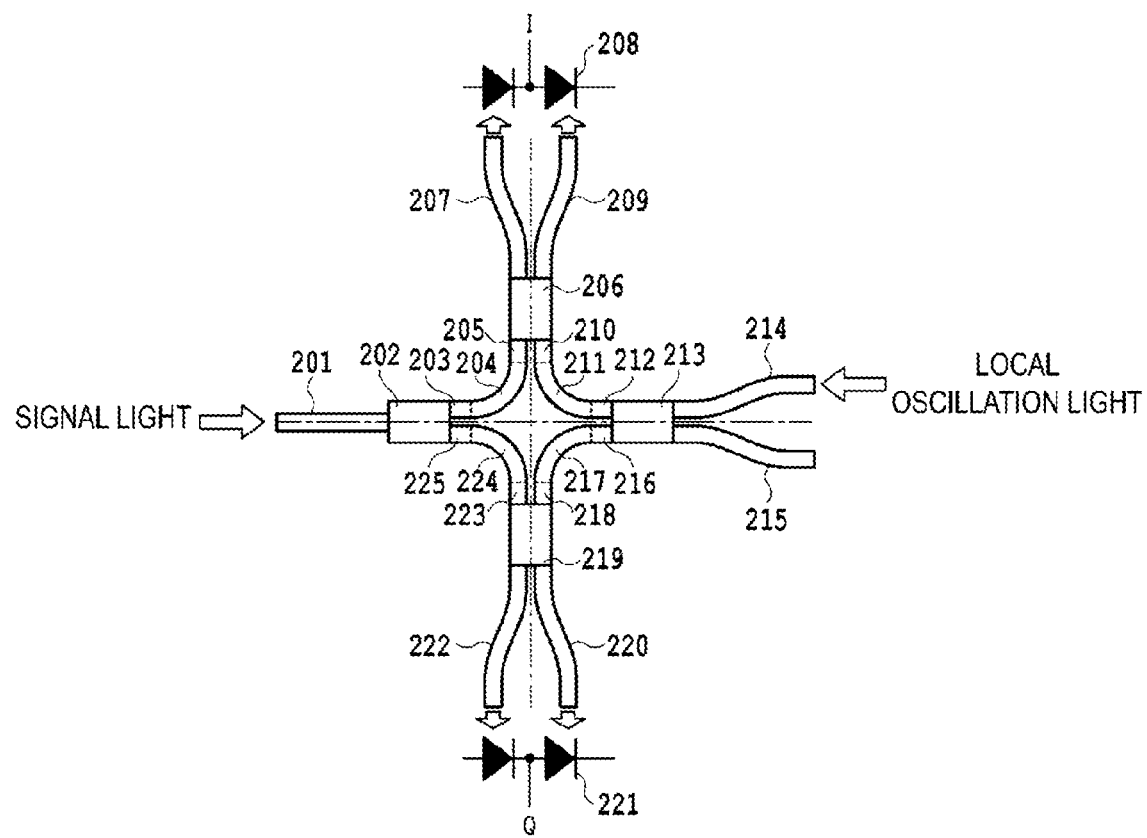
FIG. 2 is a diagram illustrating a configuration of an optical 90-degree hybrid of a configuration example 1 in a first embodiment according to the present invention.

FIG. 2 illustrates a configuration example 1 of an optical 90-degree hybrid in a first embodiment according to the present invention. In this configuration, a signal light and a local oscillation light are input into the optical 90-degree hybrid from the left and right, and optical splitters 202 and 213 at preceding stages, which branch these input beams of light and output branched light, are disposed on the left and right to face each other. Optical couplers 206 and 219, which input and multiplex the branched beams of light of the signal light and the local oscillation light branched by the respective optical splitters, and output multiplexed light as interference beams of light in an up-down direction, are disposed to face away from each other vertically. Such a structure is configured to not require crossing of the arms that connect the optical splitters with the optical couplers.

Here, a propagation process of a light input to the optical 90-degree hybrid circuit in FIG. 2 is described. A signal light input from the outside passes through a signal light input waveguide 201 and is branched into two by the optical splitter 202. A local oscillation light input from the outside passes through a local oscillation light input waveguide 214 and is branched into two by the optical splitter 213.

Two signal beams of light branched by the optical splitter 202 pass through arm waveguides 203 to 205 and 225 to 223 and are input into two optical couplers 206 and 219, respectively.

Similarly, two local oscillation beams of light branched by the optical splitter 213 pass through arm waveguides 212 to 210 and 216 to 218 and are input into two optical couplers 206 and 219, respectively.

The signal light and the local oscillation light input to the optical coupler 206 and the optical coupler 219 are multiplexed and interfered with each other, branched into two such that a phase difference between the interference beams of light is 180 degrees, and output.

The interference light between the signal light and the local oscillation light output from the optical coupler 206 is output via output waveguides 207 and 209 to a differential receiving unit 208 that is formed as an external circuit and functions as a photoelectric conversion unit.

Similarly, the interference light between the signal light and the local oscillation light output from the optical coupler 219 is output via output waveguides 222 and 220 to a differential receiving unit 221 that is formed as an external circuit and functions as a photoelectric conversion unit.

Figure 1:
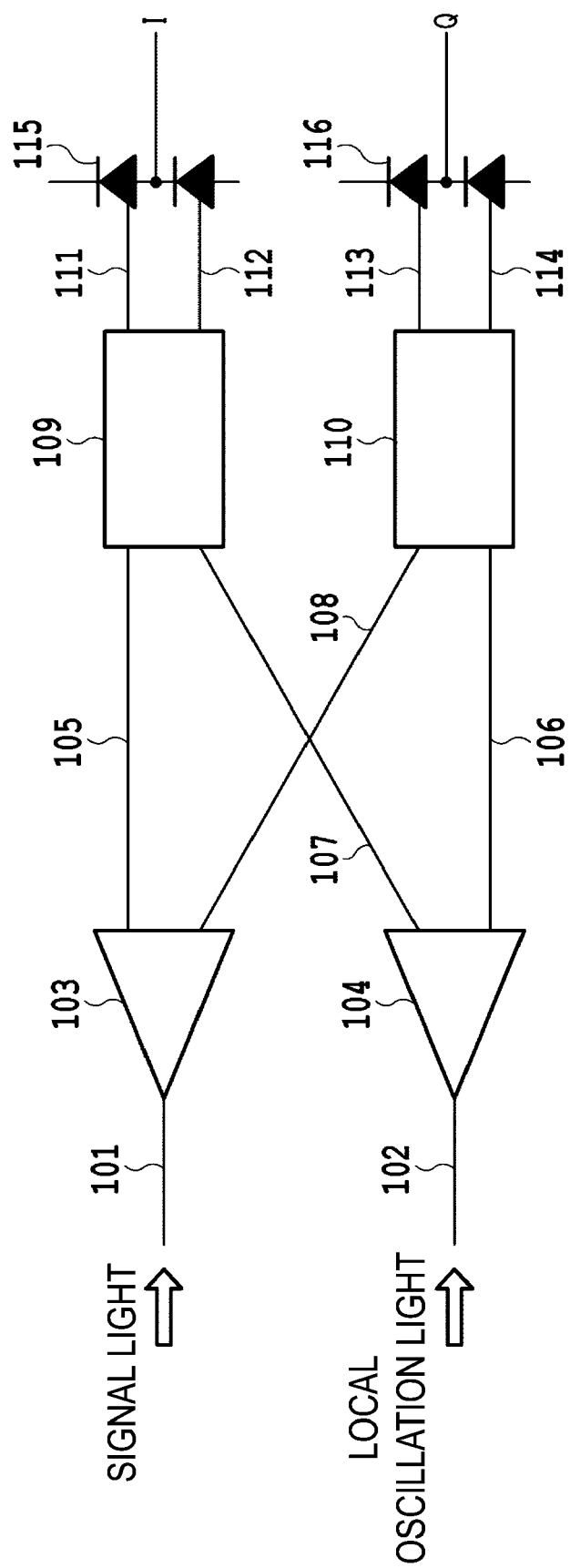
FIG. 1 is a diagram illustrating a configuration of an optical 90-degree hybrid of related art.

Here, in the optical 90-degree hybrid in FIG. 2, the optical splitter 213 is a two-input two-output optical splitter including a directional coupler or an MMI similar to the optical 90-degree hybrid in FIG. 1, and a phase difference between two optical outputs of the optical splitter 213 is 90 degrees with respect to each other. As a result, the differential receiving units 208 and 221 detect, by differential phase detection, the interference beams of light output from the respective optical couplers 206 and 219 via the output waveguides 207, 209, 222, and 220, and thus, the I and Q components of the input modulated signal can be separated.

In order to simultaneously detect the I component and the Q component of the modulated signal, waveguide lengths of two arm waveguides transmitting the signal beams of light branched by the optical splitter 202 are required to be equal to waveguide lengths of two arm waveguides transmitting the local oscillation beams of light branched by the optical splitter 213, respectively. Furthermore, by equalizing the waveguide lengths of all four arm waveguides, it is possible to use as an optical 90-degree hybrid circuit included in an optical delay interference circuit for receiving differential phase modulation signals such as DQPSK.

Here, a bent waveguide with a bend angle of 90 degrees is used for the waveguides 204, 211, 217, and 224 of the arm waveguides in the optical 90-degree hybrid in FIG. 2. In the silicon waveguide with high refractive index contrast, a curvature thereof can be significantly reduced compared to an optical waveguide made of quartz. By using such a bent waveguide without crossing the arms, the waveguide length of the arm connecting the optical splitter with the optical coupler can be shortened compared to the structure in which the arms cross each other as illustrated in FIG. 1.

Accordingly, the structure in FIG. 2 can reduce the phase error due to the processing errors of the core waveguide compared to the conventional structure in FIG. 1. Because of not crossing the arms, a structure for crossing the waveguides is unnecessary, and the optical loss can be suppressed.

As described above, in the optical 90-degree hybrid formed of a silicon waveguide, two optical splitters, into which the input signal light and the local oscillation light are input, are disposed to face each other, and two optical couplers, in which the signal light and the local oscillation branched by each splitter are multiplexed, interfered with each other, and are output, are disposes to face away from each other, such that the structure is provided that does not require crossing of the arms connecting the optical splitters with the optical couplers, and the phase error and the optical loss can be reduced.

Re-Coupling

In the optical 90-degree hybrid according to the first embodiment of the present invention in FIG. 2, the optical splitter into which the signal light is input and the optical splitter into which the local oscillation light is input are disposed to face each other. At this time, radiation mode components generated in the respective optical splitters are again incident on the optical splitters on the opposite side and re-coupled, and then, propagate to each of an input unit of the local oscillation light and an input unit of the signal light. These re-coupled beams of light are return beams of light to a light source that generates the local oscillation light or the signal light, leading to degradation in reception characteristics of a coherent receiver.

Higher-Order Mode Component

In the optical 90-degree hybrid in FIG. 2, in the bent waveguide having a small curvature in the optical circuit formed of the silicon waveguide, some of the propagating beams of light include a higher-order mode component or a radial mode component to generate an input of the higher-order mode components into an element circuit connected to a subsequent stage or an optical loss, leading to degradation in performance as an optical circuit. Here, if the silicon waveguide is under full single-mode conditions and the curvature of the bent waveguide is sufficiently large, the higher-order mode components in the bent waveguide are suppressed.

However, in the silicon waveguide, if the waveguide width is significantly decreased below first-order mode cutoff conditions, the propagation loss tends to increase. Therefore, in a case of using a silicon waveguide having a thickness of 220 nm and at a communication wavelength near a C-band, the width is generally designed to be approximately 450 nm to 500 nm near the first-order mode cutoff width in the C-band. At this time, in a case that the silicon waveguide is manufactured beyond the first-order cutoff width due to the processing error of the silicon waveguide, the higher-order mode component is excited by the bent waveguide.

The optical loss and higher-order mode component excitation in the bent waveguide can be suppressed by sufficiently increasing the curvature of the bent waveguide, but if the curvature is increased, the waveguide length of the bent waveguide increases accordingly, and thus, a difference in an optical path length between the arms increases when the processing error causes a difference in a width or thickness between the arm waveguides in the optical 90-degree hybrid, which is likely to increase the phase error as the optical 90-degree hybrid.

Here, a case that the higher-order mode component generated in the waveguide is input to the optical couplers 206 and 219 in FIG. 2 will be described.

Figure 3:
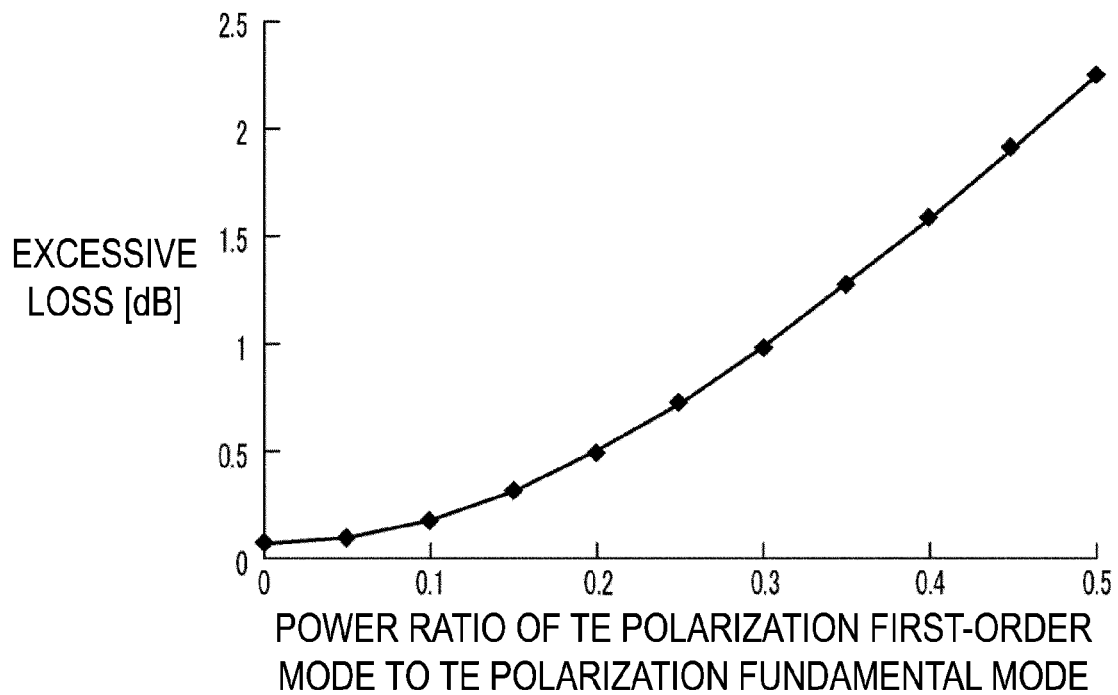
FIG. 3 is a diagram illustrating a relationship between a power ratio of a TE fundamental mode and a TE first-order mode of a propagating light, and an excessive loss.

FIG. 3 is a diagram illustrating a relationship, when a fundamental mode of TE polarization is incident on one of two input ports of a two-input two-output MMI, between a power ratio of the higher-order mode component to the fundamental mode of the TE polarization input (horizontal axis) and an excessive loss of the MMI (vertical axis: dB).

Figure 4:
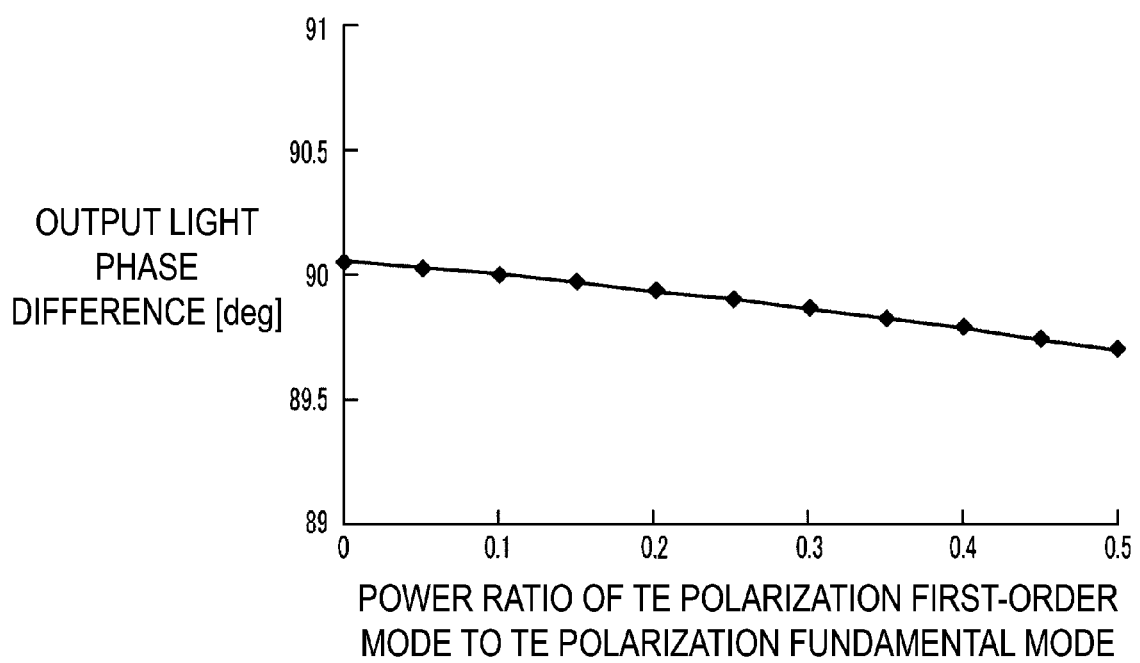
FIG. 4 is a diagram illustrating a relationship between a power ratio of a TE fundamental mode and a TE first-order mode of a propagating light, and a phase difference.

FIG. 4 is a diagram illustrating a relationship, when a fundamental mode of TE polarization is incident on one of two input ports of a two-input two-output MMI, between a power ratio of the higher-order mode component to the fundamental mode of the TE polarization input (horizontal axis) and a phase difference between beams of light propagating through two output waveguides of the MMI (vertical axis: deg). Here, the MMI used for the calculations in FIGS. 3 and 4 has a core thickness of 220 nm, an MMI width of 4 µm, an MMI length of 58 µm, and a cladding of SiO2.

As illustrated in FIGS. 3 and 4, as the higher-order mode component of the input light input to one input port of the two-input two-output MMI increases, the optical loss and the phase error (deviation from 90 degrees) also increase. Thus, in the optical 90-degree hybrid as described in FIG. 2, when the signal light and the local oscillation light are branched by the optical splitters are multiplexed by two optical couplers, the higher-order mode components generated at bent waveguide portions are incident on the optical couplers, thereby causing the optical loss and the phase error. As described above, the bent waveguide used for each arm of the optical 90-degree hybrid desirably has a structure in which the optical path length can be shortened, and the higher-order mode components and the optical loss can be suppressed.

Configuration Example 2 in First Embodiment

Figure 5:
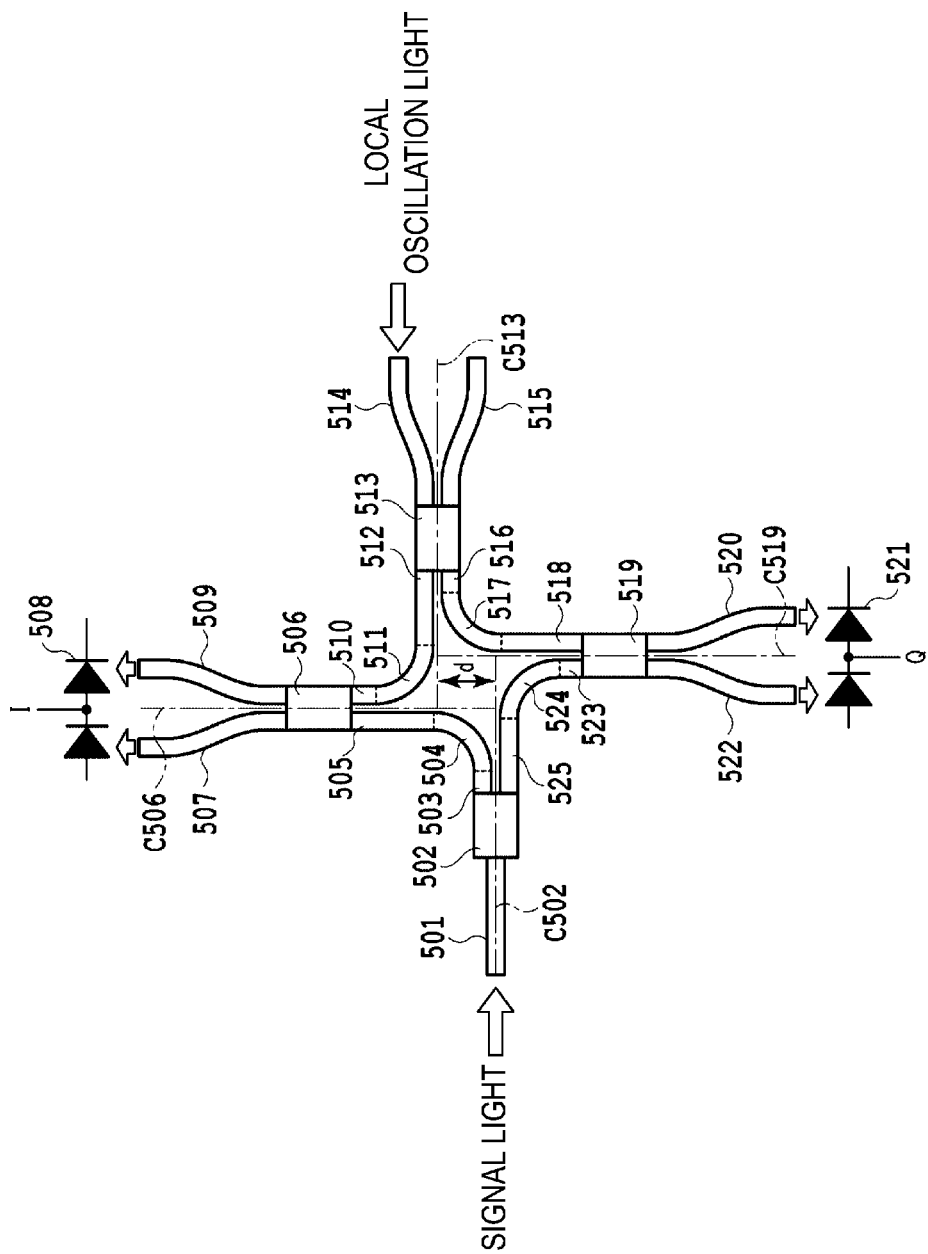
FIG. 5 is a diagram illustrating a configuration of an optical 90-degree hybrid circuit of a configuration example 2 in the first embodiment according to the present invention.

FIG. 5 illustrates an optical 90-degree hybrid of a configuration example 2 in the first embodiment according to the present invention. FIG. 5 is a plan view illustrating a configuration of the optical 90-degree hybrid that suppresses re-coupling of the radiation modes between the optical splitters facing each other and the optical couplers in the first embodiment.

In FIG. 5, a signal light input from a left signal light input waveguide 501 is branched by an optical splitter 502 which is a first optical branching unit, passes from waveguides 503 and 525 formed in straight line shapes through waveguides 504 and 524 formed in arc shapes of 90 degrees, and waveguides 505 and 523 formed in straight line shapes, and is input to optical couplers 506 and 519 which are first and second optical coupling unit.

Similarly, in FIG. 5, a local oscillation light input from a right local oscillation light input waveguide 514 is branched by an optical splitter 513 which is a second optical branching unit, passes from waveguides 512 and 516 formed in straight line shapes through waveguides 511 and 517 formed in arc shapes of 90 degrees, and waveguides 510 and 518 formed in straight line shapes, and is input to the optical couplers 506 and 519 which are the first and second optical coupling unit.

At this time, a phase difference between two local oscillation beams of light branched by the optical splitter 513 is 90 degrees with respect to each other. The waveguides 504, 511, 517, and 524 are parts of an arm waveguides that connect the optical splitters and the optical couplers, and are bent waveguides having an arc-shaped curved shape.

Two output beams of light (signal beams of light) branched by the one-input two-output optical splitter 502 are required to have the same phase when incident on the optical couplers 506 and 519, and two output beams of light (local oscillation beams of light) branched by the two-input two-output optical splitter 513 are required to have the phase difference of 90 degrees when input to the optical couplers 506 and 519.

In the structure according to the first embodiment illustrated in FIG. 5, among four paths of arm waveguides connecting the optical splitters and the optical couplers, the arm waveguide including the waveguides 503, 504, and 505 is equal, in an optical path length, to the arm waveguide including the waveguides 523, 524, and 525, the optical path length being a sum of optical path lengths of three waveguides included in each arm waveguide. Similarly, the arm waveguide including the waveguides 510, 511, and 512 is equal, in an optical path length, to the arm waveguide including the waveguides 516, 517, and 518. The optical path lengths of each pair of two pairs of arm waveguides being equal maintains the phase relationship as the optical 90-degree hybrid.

In this configuration example 2, among four straight line-shaped output waveguides of the arm waveguides through which the signal light and the local oscillation light branched by the optical splitters 502 and 513 propagate, one waveguide 525 or 512 is formed longer than the other waveguide 503 or 516. Furthermore, among four straight line-shaped input waveguides of the arm waveguides connected to the optical couplers 506 and 519, one waveguide 505 or 518 is formed longer than the other waveguide 510 or 523.

In this manner, one of two output waveguides of each optical splitter and one of two input waveguides of each optical coupler being made longer than the other gives a structure in which central axes in a light propagation direction of the optical splitter 502 into which the signal light is input and the optical splitter 513 into which the local oscillation light is input (lines illustrated by c502 and c513 in FIG. 5, each between two output waveguides of each splitter) do not overlap with and deviate from each other.

The central axes in the light propagation direction of these optical splitters 502 and 513 disposed to face each other being provided to deviate from each other can suppress the radiation mode radiated by one optical splitter being re-coupled to the other optical splitter disposed to face the one optical splitter. Two central axes C502 and C513 do not necessarily deviate in parallel, and it is sufficient that the optical axes do not overlap with each other to an extent that re-coupling in the radial modes is suppressed. This can suppress re-coupling of the radiation modes in the opposing optical splitters and can suppress the degradation in reception characteristics of the coherent receiver including the optical 90-degree hybrid.

Similarly, a central axis (C506) in the light propagation direction of the optical coupler 506 is configured to not overlap with and deviate from a central axis (C519) in the light propagation direction of the optical coupler 519. This can suppress re-coupling of the radiation modes in the optical splitters facing away from each other and can further suppress the degradation in the reception characteristics of the coherent receiver including the optical 90-degree hybrid. In short, in the optical 90-degree hybrid circuit including two optical branching units facing each other and two optical coupling units facing away from each other, the optical branching units and the optical coupling units are arranged so that the optical axes do not overlap with each other.

Note that in three waveguides constituting each of four paths of arm waveguides, including the following embodiments, distinction between straight and curved line portions is made for convenience of description, design and implementation, but is not essential. The gist is that the central axes in the light propagation direction of the optical branching units facing each other or the optical coupling units facing away from each other does not overlap, and, for example, each of the arm waveguides may include, for example, the bent waveguides only.

Configuration Example 3 in First Embodiment

Figure 6:
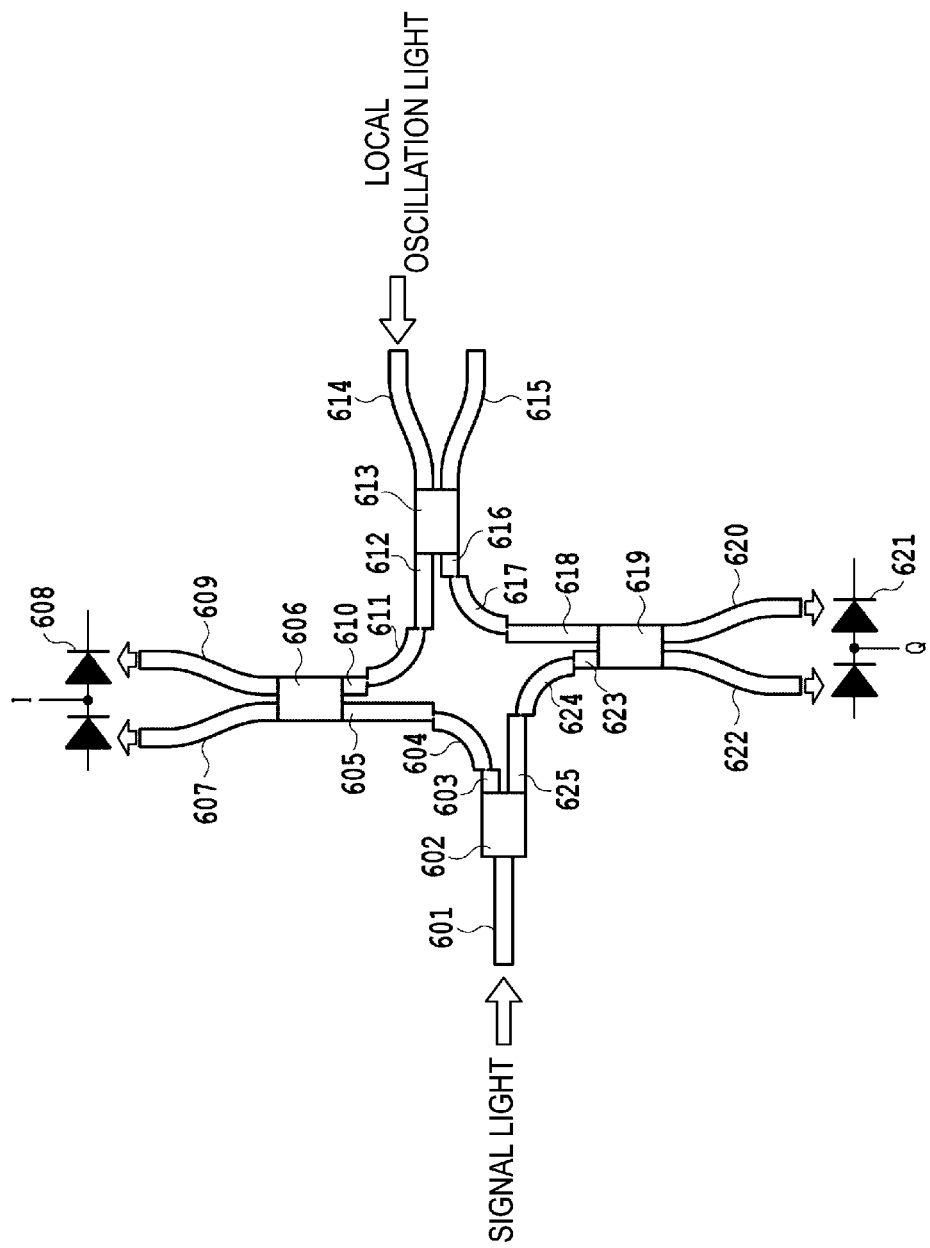
FIG. 6 is a diagram illustrating a configuration of an optical 90-degree hybrid circuit of a configuration example 3 in the first embodiment according to the present invention.

FIG. 6 is a plan view illustrating a configuration example, as a configuration example 3 in the first embodiment, in which an offset is provided to each bent waveguide of the arm waveguide in the structure of the optical 90-degree hybrid that suppresses re-coupling of the radiation modes between the optical splitters facing each other and the optical couplers facing away from each other.

Figure 8:
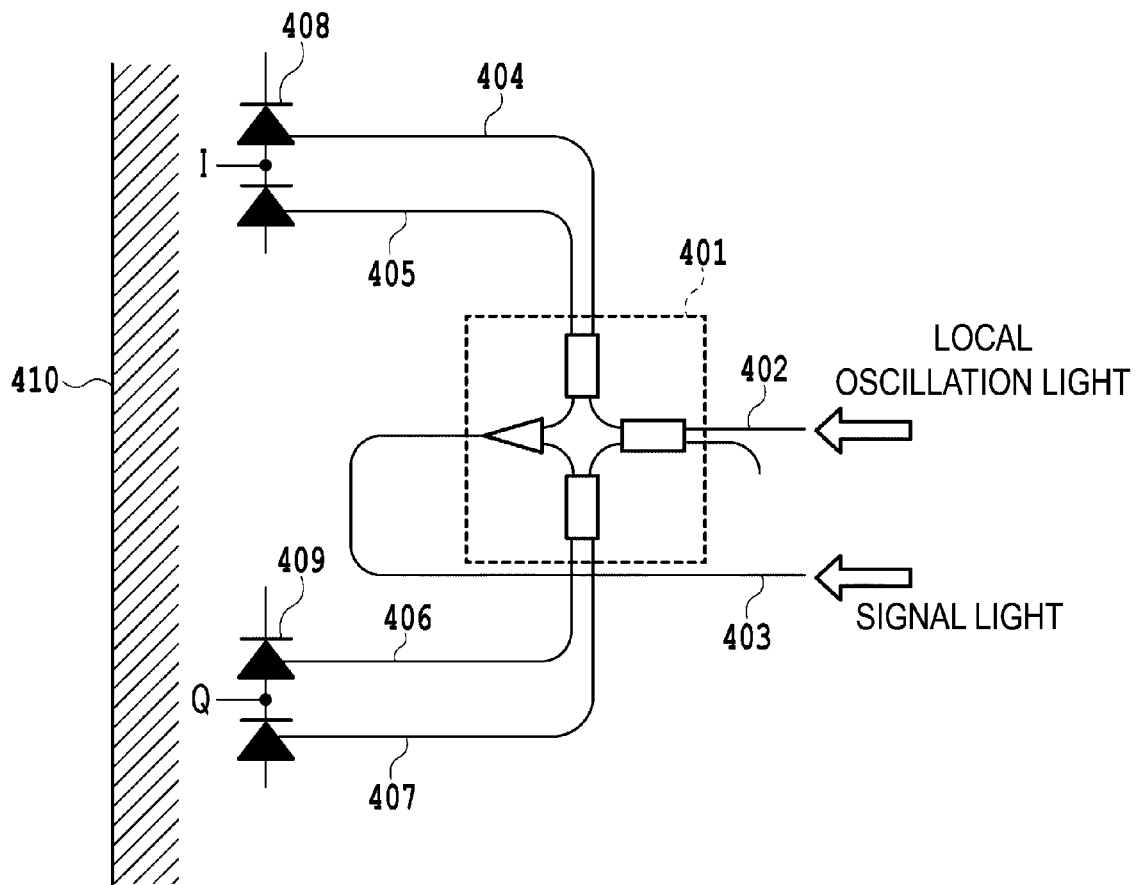
FIG. 8 is a diagram illustrating a configuration in which a photoelectric conversion units are disposed at an optical waveguide tip end, and input positions of a signal light and a local oscillation light are aligned.

Here, the offset means that without changing the waveguide width of the bent waveguide, each of four bent waveguides is made to have a slightly smaller curvature radius of the arc (for example, the curvature radius is decreased by several nm to several tens of nm) and disposed to deviate toward the center of the bend. In the bent waveguide the arc of which is drawn with the offset, as illustrated in FIG. 8, a slight discrepancy occurs in the waveguide width direction at connection portions between the arc shaped bent waveguide and the front and rear waveguide parts. However, in the bent waveguide, the center of a light beam deviates toward the outside of the bend and conforms to the front and rear straight line waveguide parts, and thus, the optical loss and the higher-order modes can be suppressed compared to a case that an offset is not provided.

By providing such an offset to the connection portions in the front and rear of the bent waveguide of the arc shape of the arm waveguide, the optical loss and the higher-order mode can be suppressed.

By providing an offset to each of the arc-shaped bent waveguides 604, 611, 617, and 624 used in the arm waveguides, the optical loss and the higher-order modes generated in the bent waveguides can be suppressed.

In FIG. 6, a signal light input from a left signal light input waveguide 601 is branched by an optical splitter 602 which is the first optical branching unit, passes from waveguides 603 and 625 formed in straight line shapes through waveguides 604 and 624 formed in arc shapes of 90 degrees, and waveguides 605 and 623 formed in straight line shapes, and is input to optical couplers 606 and 619 which are the first and second optical coupling unit.

Similarly, in FIG. 6, a local oscillation light input from a right local oscillation light input waveguide 614 is branched by an optical splitter 613 which is the second optical branching unit, passes from waveguides 612 and 616 formed in straight line shapes through waveguides 611 and 617 formed in arc shapes of 90 degrees, and waveguides 610 and 618 formed in straight line shapes, and is input to the optical couplers 606 and 619 which are the first and second optical coupling unit.

At this time, a phase difference between two local oscillation beams of light branched by the optical splitter 613 is 90 degrees with respect to each other.

In FIG. 6, similar to the structure illustrated in FIG. 5, among four straight line-shaped output waveguides of the optical splitters 602 and 613, one waveguide 625 or 612 is formed longer than the other waveguide 603 or 616. Furthermore, among four straight line-shaped input waveguides of the optical couplers 606 and 619, one waveguide 605 or 618 is formed longer than the other waveguide 610 or 623.

Two arm waveguides (603 to 605, 625 to 623) through which two signal beams of light branched by the one-input two-output optical splitter 602 propagate are equal to each other in their optical path lengths (a sum of the optical path lengths of three waveguides included in each arm waveguide), and two arm waveguides (612 to 610, 616 to 618) through which two local oscillation beams of light branched by the optical splitter 613 propagate are equal to each other in their optical path lengths.

The structure described above, in which the central axes of the optical splitters facing with each other or the optical couplers are provided with deviations to be arranged not to overlap with each other, can suppress the degradation in the reception characteristics of the optical 90-degree hybrid due to re-coupling of the radiation modes in the optical splitters facing each other. Furthermore, the offset is provided to the bent waveguide of the arm waveguide to shorten the optical path length of the bent waveguide used in the arm waveguide that connects the optical splitters, which can suppress the optical loss and the phase error generated in the bent waveguide, and can further suppress the optical loss and the phase error in the optical 90-degree hybrid.

Configuration Example 4 in First Embodiment

Figure 7:
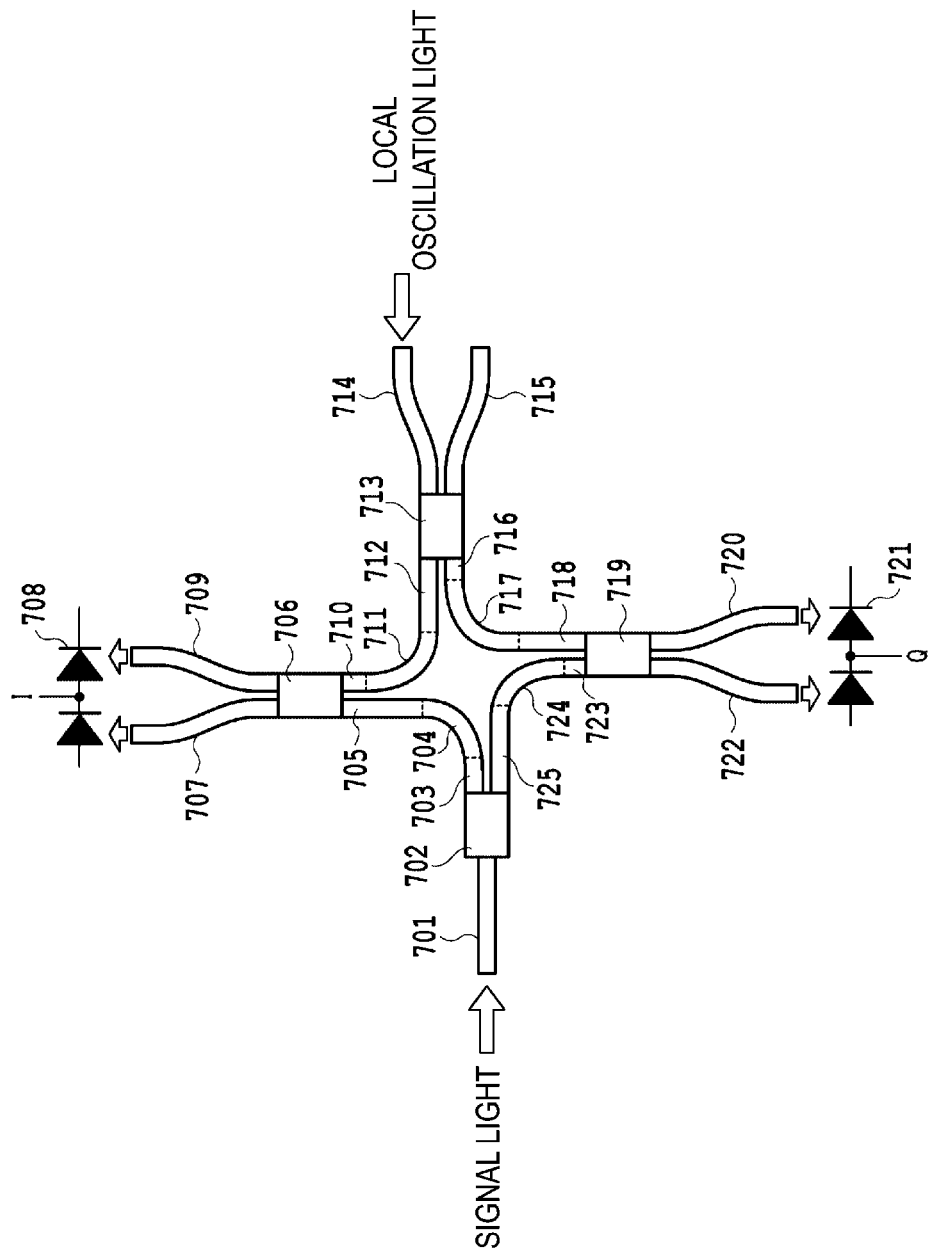
FIG. 7 is a diagram illustrating a configuration of an optical 90-degree hybrid circuit of a configuration example 4 in the first embodiment according to the present invention.

FIG. 7 is a diagram illustrating a structure of an optical 90-degree hybrid, as a configuration example 4 in the first embodiment, in which a bent waveguide used in an arm waveguide is a bent waveguide including a curved portion drawn by a clothoid curve.

In FIG. 7, a signal light input from a left signal light input waveguide 701 is branched by an optical splitter 702 which is the first optical branching unit, passes from waveguides 703 and 725 formed in straight line shapes through waveguides 704 and 724 formed in clothoid curve shapes, and waveguides 705 and 723 formed in straight line shapes, and is input to optical couplers 706 and 719 which are the first and second optical coupling unit.

Similarly, in FIG. 7, a local oscillation light input from a right local oscillation light input waveguide 714 is branched by an optical splitter 713 which is the second optical branching unit, passes from waveguides 712 and 716 formed in straight line shapes through waveguides 711 and 717 formed in clothoid curve shapes, and waveguides 710 and 718 formed in straight line shapes, and is input to the optical couplers 706 and 719 which are the first and second optical coupling unit.

At this time, a phase difference between two local oscillation beams of light branched by the optical splitter 713 is 90 degrees with respect to each other.

Here, the clothoid curve is a spiral curve where a curvature (inverse of a curvature radius) varies with a uniform increase or decrease in proportion to a curve length, and it is known that a bent waveguide having a clothoid curve is lower in the loss and can suppress the higher-order mode compared to a bent waveguide having an arc of the same size. The bent waveguide having a clothoid curve is described in NPL 2 in detail. In this modified example 2, a curved shape in which an angular difference between tangent lines at both ends of section of the clothoid curve is 90 degrees is used for the curved shape of the bent waveguide.

In the configuration example 4 in FIG. 7, similar to the structure of the configuration example 3 illustrated in FIG. 6, the bent waveguides 704, 711, 717, and 724 used in four arm waveguides connecting the respective splitters are bent waveguides formed in the clothoid curve shape in which inclinations at the ends have a difference of 90 degrees, which can suppress the higher-order mode generated in the bent waveguide.

Similar to the configuration examples 2 and 3 in the first embodiment illustrated in FIGS. 5 and 6, one waveguide 725 or 712 among four straight line-shaped output waveguides of the optical splitters 702 and 713 is formed longer than the other waveguide 703 or 716, and one waveguide 705 or 718 among four straight line-shaped input waveguides of the optical couplers 706 and 719 is formed longer than the other waveguide 710 or 723. Two arm waveguides (703 to 705, 725 to 723) through which two signal beams of light branched by the optical splitter 702 propagate are equal to each other in their optical path lengths, and two arm waveguides (710 to 712, 716 to 718) through which two local oscillation beams of light branched by the optical splitter 713 propagate are equal to each other in their optical path lengths.

The structure described above, in which the central axes of the optical splitters facing with each other or the optical couplers facing away from each other are provided with deviations to be arranged not to overlap with each other, can suppress the degradation in the reception characteristics of the optical 90-degree hybrid due to re-coupling of the radiation modes in the optical splitters facing each other or the optical couplers. Furthermore, the bent waveguide used in the arm waveguide is formed in a clothoid curve to shorten the optical path length of the bent waveguide used in the arm waveguide that connects the optical splitters, which can suppress the optical loss and the phase error generated in the bent waveguide, and can further suppress the optical loss and the phase error in the optical 90-degree hybrid.

Second Embodiment

In using the structure of the optical 90-degree hybrid according to the first embodiment of the present invention, incident orientations of the signal light and the local oscillation light are opposite to each other as illustrated in FIG. 2. If these incident orientations can be aligned in the same orientation, the signal light and the local oscillation light can be collectively optically connected to the coherent optical receiver including the optical 90-degree hybrid using a fiber array or the like, and thus, the number of components can be reduced and mounting costs can be reduced. Furthermore, in order to improve the electronic packaging easiness and the high frequency characteristics of the photoelectric conversion units, the photoelectric conversion units are preferably arranged collectively at an end portion of the optical circuit chip.

Figure 9:
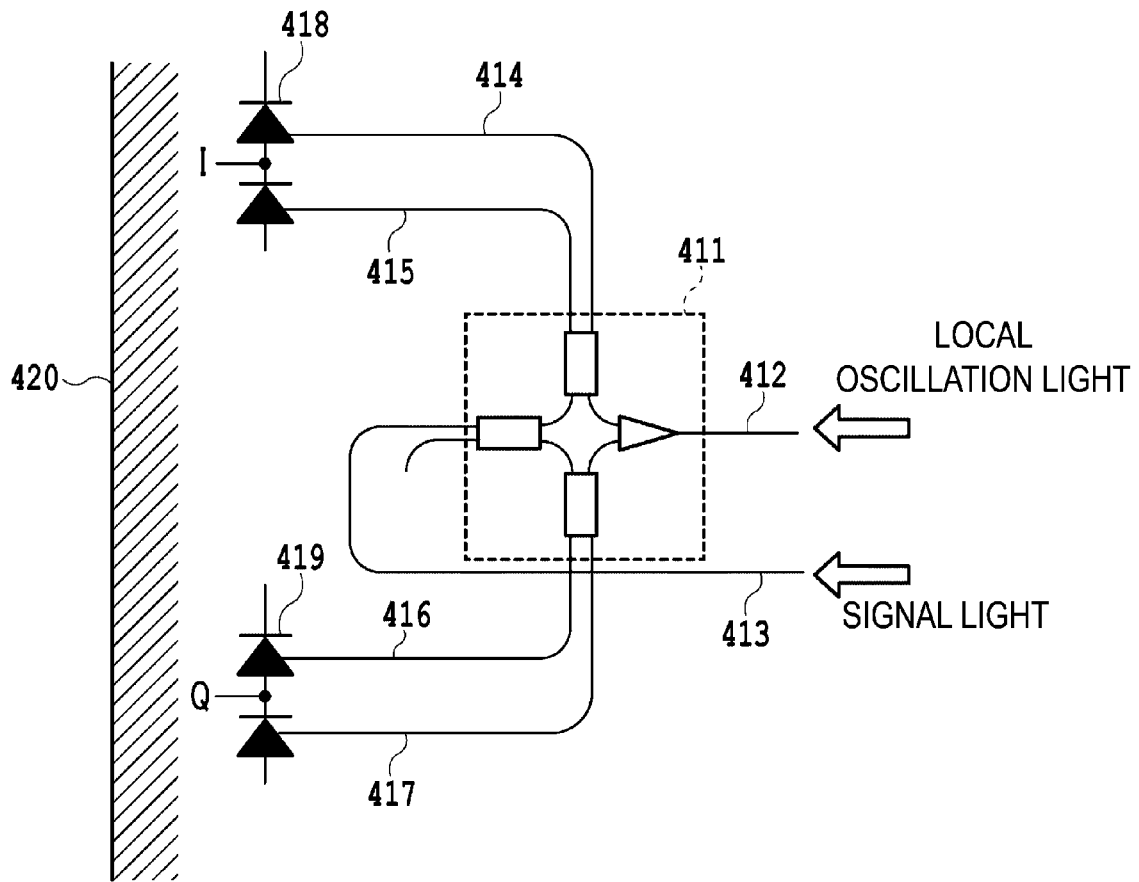
FIG. 9 is a diagram illustrating another configuration in which the photoelectric conversion units are disposed at the optical waveguide tip end, and the input positions of the signal light and the local oscillation light are aligned.

In order to align the incident orientations of the signal light and the local oscillation light in the same orientation and collectively arrange the photoelectric conversion units at the end portion of the optical circuit chip, a signal light input waveguide 403 needs to cross interference light output waveguides 406 and 407 connecting from an optical coupler to a photoelectric conversion unit 409 as illustrated in FIG. 8, or a local oscillation light input waveguide 413 needs to cross interference light output waveguides 416 and 417 connecting from the optical coupler to a photoelectric conversion unit 419 as in FIG. 9.

Here, each of circuits 401 and 411 surrounded by dotted lines in FIG. 8 and FIG. 9 is a circuit including two optical splitters, two optical couplers, and four arm waveguides, and is illustrated as a schematic view of the structure of the optical 90-degree hybrid illustrated in FIG. 2 with the exception of the photoelectric conversion units. At this time, each of the signal light in FIG. 8 and the local oscillation light in FIG. 9 intersects two waveguides, thereby causing the optical loss.

The structure of the optical 90-degree hybrid illustrated in FIGS. 8 and 9 illustrates a structure in which the photoelectric conversion units are arranged at the end portion of the optical waveguide chip in order to improve the electronic packaging easiness and the high frequency characteristics of the photoelectric conversion units, and the input positions of the signal light and the local oscillation light are aligned in order to improve optical connection easiness in light input portions of the signal light and the local oscillation light. This structure involves a section where the waveguide that inputs the signal light crosses the waveguide connected to the photoelectric conversion unit, or a section where the waveguide that the inputs the local oscillation light crosses the waveguide connected to the photoelectric conversion unit. The signal light or the local oscillation light passing through two crossing sections disadvantageously cause the optical loss to increase.

Figure 10:
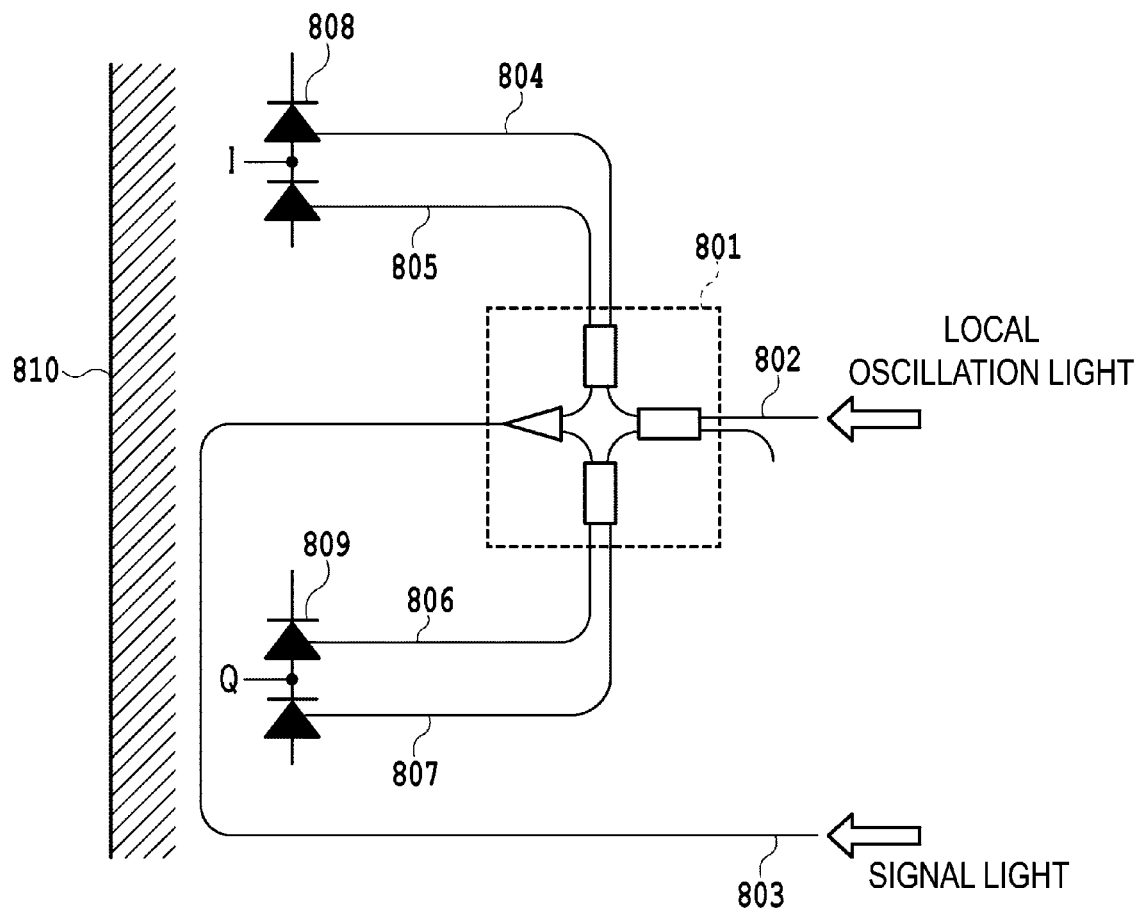
FIG. 10 is a diagram illustrating a configuration of an optical 90-degree hybrid circuit according to a second embodiment of the present invention.
Figure 11:
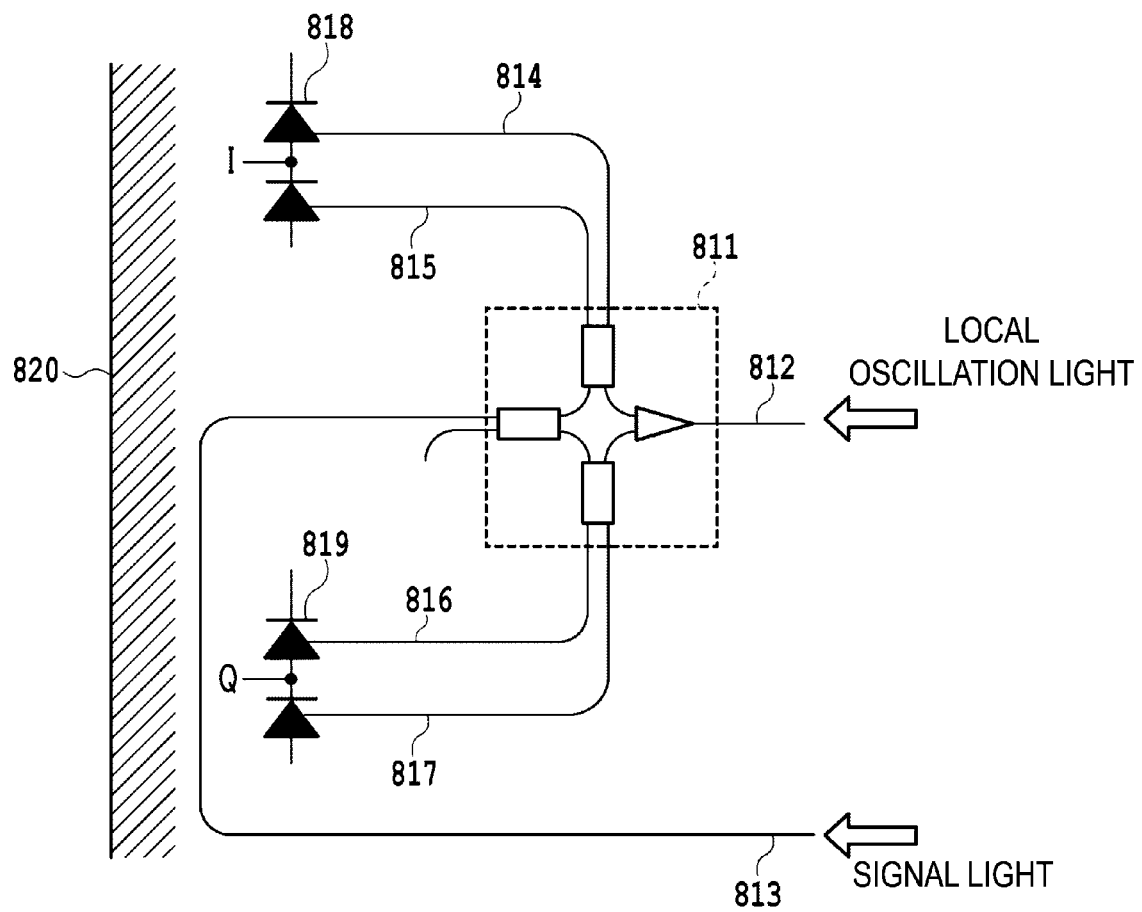
FIG. 11 is a diagram illustrating another configuration of the optical 90-degree hybrid circuit according to the second embodiment of the present invention.

FIGS. 10 and 11 illustrate a structure, as a second embodiment of the present invention, in which, the waveguides of the optical 90-degree hybrid do not cross each other, the input positions and the input orientations of the signal light and the local oscillation light can be aligned, and the photoelectric conversion units can be arranged at the optical waveguide chip end portion.

FIGS. 10 and 11 illustrate signal light input waveguides 803 and 812, and local oscillation light input waveguides 802 and 813, respectively. The respective figures illustrate circuits 801 and 811 each of which includes two optical splitters, two optical couplers, and four arm waveguides, and is illustrated as a schematic view of the structure of the optical 90-degree hybrid illustrated in each of FIGS. 2, 5, 6, and 7 with the exception of the photoelectric conversion units. In FIGS. 10 and 11, photoelectric conversion units 808, 809, 818, and 819 are illustrated, and optical circuit chip end portion 810 and 820 are also illustrated.

As illustrated in FIG. 10, the optical waveguides can be prevented from crossing each other by passing the signal light input waveguide 803 to detour between the chip end portion 810 and the photoelectric conversion unit 809. At this time, the same effect can be obtained by passing the signal light input waveguide 803 between the chip end portion 810 and the photoelectric conversion unit 808 instead of passing between the chip end portion 810 and the photoelectric conversion unit 809.

As illustrated in FIG. 11, the positional relationship of inputs between the local oscillation light and the signal light is reversed from that in FIG. 10 to pass the local oscillation light input waveguide 813 to detour between the chip end portion 820 and the photoelectric conversion unit 819, thereby, the optical waveguides can be prevented from crossing each other. At this time, the same effect can be obtained by passing the signal light input waveguide 813 between the chip end portion 820 and the photoelectric conversion unit 818 instead of passing between the chip end portion 820 and the photoelectric conversion unit 819. Note that as illustrated in FIGS. 10 and 11, the photoelectric conversion units 808 and 809, and 818 and 819 may be disposed adjacent to the chip end portions 810 and 820.

As described above, by passing the input waveguide of the signal light or the local oscillation light which is the input light to the optical 90-degree hybrid, between the chip end portion and the photoelectric conversion unit, the optical waveguides can be prevented from crossing each other, the input positions of the signal light and the local oscillation light can be aligned without increasing the optical loss, and the optical connection easiness in the light input portions can be improved. At the same time, the photoelectric conversion units can be disposed adjacent to the optical circuit chip end portion, which can contribute to the improvement in the electronic and optical packaging easiness, and the improvement in the high frequency characteristics.

INDUSTRIAL APPLICABILITY

As described above, according to the present invention, it is possible to provide an optical 90-degree hybrid formed of a silicon waveguide capable of suppressing an optical loss and a phase error, and facilitating electronic packaging and optical packaging.

REFERENCE SIGNS LIST 101, 201, 501, 601, 701, 403, 412, 803, 812 Signal light input waveguide
102, 214, 514, 614, 714, 402, 413, 802, 813 Local oscillation light input waveguide
103, 104, 202, 213, 502, 513, 602, 613, 702, 713 Optical splitter
111 to 114, 207, 209, 220, 222, 404 to 407, 414 to 417, 507, 509, 520, 522, 607, 609, 620, 622, 707, 709, 720, 722, 804 to 807, 814 to 817 Interference light output waveguide
105 to 108, 203 to 205, 210 to 212, 216 to 218, 223 to 225, 503 to 505, 510 to 512, 516 to 518, 523 to 525, 603 to 605, 610 to 612, 616 to 618, 623 to 625, 703 to 705, 710 to 712, 716 to 718, 723 to 725, (Arm) Waveguide
215, 515, 615 to 715 Input waveguide
109, 110, 206, 219, 506, 519, 606, 619, 706, 719 Optical coupler
115, 116, 208, 221, 508, 521, 608, 621, 708, 721 Differential receiving unit
408, 409, 418, 419, 808, 809, 818, 819 Photoelectric conversion unit
401, 411, 802, 813 Circuit
410, 420, 810, 820 Chip end portion

The invention claimed is:

1. An optical 90-degree hybrid circuit comprising:
a first optical branching unit configured to branch a first input light into a first output light and a second output light, the first output light and the second output light having an identical phase;
a second optical branching unit configured to branch a second input light into a third output light and a fourth output light, a phase difference between the third output light and the fourth output light being 90 degrees;
a first optical coupling unit configured to multiplex the first output light and the third output light to generate first and second interference beams of light;
a second optical coupling unit configured to multiplex the second output light and the fourth output light to generate third and fourth interference beams of light;
a first arm waveguide configured to guide the first output light, the first arm waveguide including at least a first bent portion and a first straight portion;
a second arm waveguide configured to guide the second output light, the second arm waveguide including at least a second bent portion and a second straight portion;
a third arm waveguide configured to guide the third output light, the third arm waveguide including at least a third bent portion and a third straight portion; and
a fourth arm waveguide configured to guide the fourth output light, the fourth arm waveguide including at least a fourth bent portion and fourth straight portion,
wherein an optical path length of the first arm waveguide is equal to an optical path length of the second arm waveguide,
an optical path length of the third arm waveguide is equal to an optical path length of the fourth arm waveguide,
one of the first and second straight portions are longer than one of the third and fourth straight portions such that a central axis of the first optical branching unit in a light propagation direction does not overlap with a central axis of the second optical branching unit in a light propagation direction, and a central axis of the first optical coupling unit in a light propagation direction does not overlap with a central axis of the second optical coupling unit in a light propagation direction.

2. The optical 90-degree hybrid circuit according to claim 1, wherein the first to fourth bent portions each formed in a curved shape.

3. The optical 90-degree hybrid circuit according to claim 2,
wherein the curved shape is an arc shape, and
each of the bent portions is provided with an offset between the bent portion and front and rear waveguide parts of the arc shape.

4. The optical 90-degree hybrid circuit according to claim 2, wherein the curved shape is a clothoid curve shape.

5. The optical 90-degree hybrid circuit according to claim 1,
wherein the optical 90-degree hybrid circuit is formed in a silicon optical waveguide chip,
the optical 90-degree hybrid circuit includes:
a first photoelectric conversion unit configured to differentially receive the first and second interference beams of light; and
a second photoelectric conversion unit configured to differentially receive the third and fourth interference beams of light,
a waveguide through which the first or second input light propagates passes between the first or second photoelectric conversion unit and an end portion of the silicon optical waveguide chip, and
orientations of inputs of the first and second input beams of light coincide with each other.

6. The optical 90-degree hybrid circuit according to claim 1,
wherein the optical 90-degree hybrid circuit is formed in a silicon optical waveguide chip,
the optical 90-degree hybrid circuit includes:
a first photoelectric conversion unit configured to differentially receive the first and second interference beams of light; and
a second photoelectric conversion unit configured to differentially receive the third and fourth interference beams of light,
a waveguide through which the first or second input light propagates passes between the first or second photoelectric conversion unit and an end portion of the silicon optical waveguide chip, and
orientations of inputs of the first and second input beams of light coincide with each other.

7. The optical 90-degree hybrid circuit according to claim 2,
wherein the optical 90-degree hybrid circuit is formed in a silicon optical waveguide chip,
the optical 90-degree hybrid circuit includes:
a first photoelectric conversion unit configured to differentially receive the first and second interference beams of light; and
a second photoelectric conversion unit configured to differentially receive the third and fourth interference beams of light,
a waveguide through which the first or second input light propagates passes between the first or second photoelectric conversion unit and an end portion of the silicon optical waveguide chip, and
orientations of inputs of the first and second input beams of light coincide with each other.

8. The optical 90-degree hybrid circuit according to claim 3,
wherein the optical 90-degree hybrid circuit is formed in a silicon optical waveguide chip,
the optical 90-degree hybrid circuit includes:
a first photoelectric conversion unit configured to differentially receive the first and second interference beams of light; and
a second photoelectric conversion unit configured to differentially receive the third and fourth interference beams of light,
a waveguide through which the first or second input light propagates passes between the first or second photoelectric conversion unit and an end portion of the silicon optical waveguide chip, and
orientations of inputs of the first and second input beams of light coincide with each other.

9. The optical 90-degree hybrid circuit according to claim 4,
wherein the optical 90-degree hybrid circuit is formed in a silicon optical waveguide chip,
the optical 90-degree hybrid circuit includes:
a first photoelectric conversion unit configured to differentially receive the first and second interference beams of light; and
a second photoelectric conversion unit configured to differentially receive the third and fourth interference beams of light,
a waveguide through which the first or second input light propagates passes between the first or second photoelectric conversion unit and an end portion of the silicon optical waveguide chip, and
orientations of inputs of the first and second input beams of light coincide with each other.

* * * * *